Jan. 5, 1932.  A. O. COBBS  1,840,022

IDENTIFICATION OR CERTIFICATE HOLDER

Filed March 2, 1931

Inventor
A. O. Cobbs
By M. Talbert Dick
Attorney

Patented Jan. 5, 1932

1,840,022

UNITED STATES PATENT OFFICE

ANSALEM ORVILLE COBBS, OF DES MOINES, IOWA

IDENTIFICATION OR CERTIFICATE HOLDER

Application filed March 2, 1931. Serial No. 519,599.

The principal object of my invention is to provide an identification or certificate holder for vehicles such as automobiles and trucks that is capable of being quickly attached or detached from the steering column of the vehicle.

A further object of my invention is to provide an identification or certificate holder for holding automobile license certificates, drivers' licenses, or the like that permits the indicia in the holder to be viewed from a position inside the vehicle to which it is secured as well as from a position outside of the vehicle.

A still further object of this invention is to provide an identification or certificate holder that is capable of having a certificate easily and quickly placed in the same or removed from the same.

A still further object of my invention is to provide a simple, visible, identification or certificate holder for vehicles that may be easily installed without in any way damaging the vehicle to which it is secured.

A still further object of this invention is to provide an identification or certificate holder that is refined in appearance, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Holders for displaying certificates, drivers' licenses and the like have been on the market for a great number of years, but these holders are usually rigid frames and must be attached in the seating compartment of the vehicle by bolts, screws and the like, thereby making them not only difficult to install but permanently damaging the vehicle.

Also certificates cannot be easily placed in them or removed from them. I have eliminated such objections by providing a non-rigid certificate holder that may be easily and quickly attached or detached from the steering column of a vehicle.

Figures 1, 2:
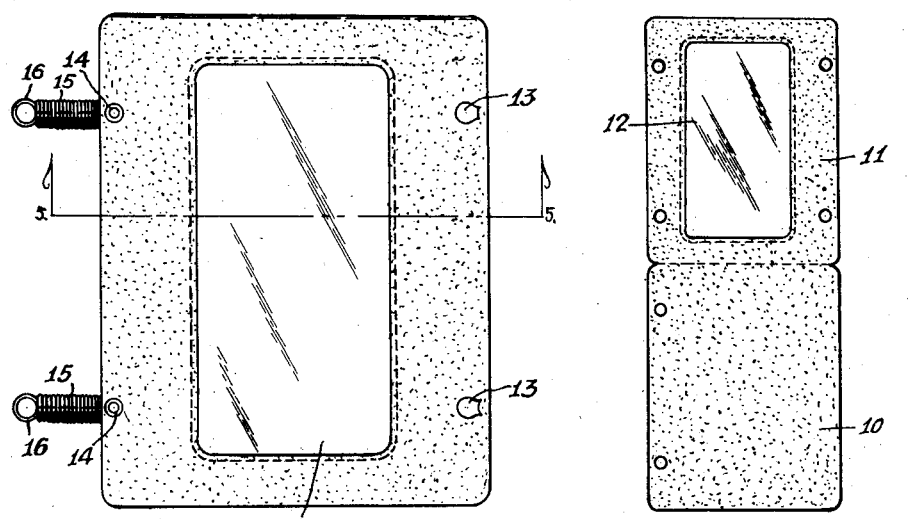
Fig. 1 is a plan view of my complete certificate holder ready for use.
Fig. 2 is a plan view of the flexible base member such as leather, leatherette, or the like and a transparent sheet attached thereto before the parts are folded and properly secured together to make up the certificate holder.
Figure 3:
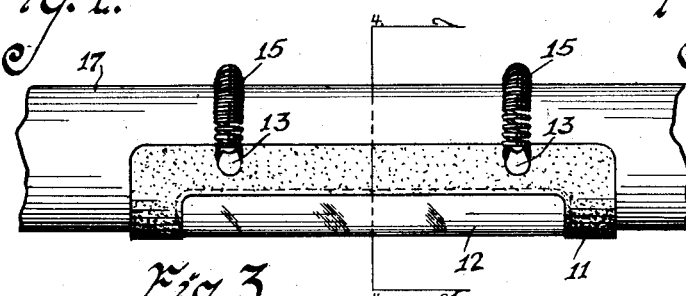
Fig. 3 is a side view of my identification or certificate holder secured to the steering column of a vehicle.
Figure 5:
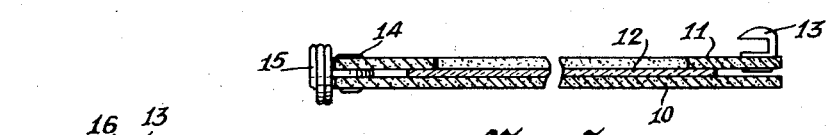
Fig. 5 is a cross sectional view of the holder taken on line 5—5 of Fig. 1 and more fully illustrates its construction.
Figure 4:
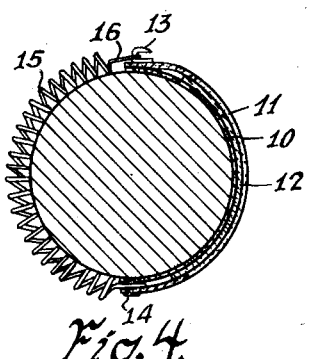
Fig. 4 is a cross sectional view of my invention wrapped around and secured to a steering column or like and is taken on line 4—4 of Fig. 3.

The base portion of my invention is made from a single rectangular elongated sheet of flexible material such as leather, leatherette or the like. This sheet is doubled back upon itself to form the back portion 10 and the front portion 11, as shown by the dotted line in Fig. 2. This creates a rectangular design of pleasing and desirable dimensions, as shown in Fig. 1. In the front portion 11 is an opening which is closed by transparent material 12, such as celluloid, isinglass or the like. This isinglass may be secured to the front portion 11 by sewing, as illustrated in the drawings. By this construction if a certificate is between the back portion 10 and front portion 11, it may be easily viewed through the transparent sheet 12. Secured and spaced apart on the front portion 11 near one of its side marginal edges are two hook rivets 13. The numeral 14 designates two rivets extending through and spaced apart in the other marginal side portion of the member 11, and the side marginal portion of the member 10 adjacent to it, as shown in the drawings, thereby binding and securing the members 10 and 11 together at these two points. Secured to each of the rivets 14 is a small coil spring 15 having a loop 16 at its free outer end. This completes my simple successful certificate holder and to attach it around a steering column 17 of an automotive vehicle, it is merely necessary to fold the certificate holder partially around the column and then manually draw loop 16 to points where they may be hooked onto the hook rivets 13, as shown in Fig. 3 and Fig. 4.

As it was necessary to stretch the coil springs 15 to accomplish this, the certificate holder will be yieldingly held tightly by the coil springs on the steering column, thereby the certificate holder may be easily viewed from a position inside the vehicle or from a position outside the vehicle. To remove the certificate holder from the column 17, it is merely necessary to manually stretch the spring 15 and uncatch the loop 16 from the two hook rivets 13.

In order that the spring 15 will extend in a desirable straight line around the column 17, the rivets 13 should be approximately in a direct line with the rivets 14, as shown in the drawings. If the open end of the certificate holder is placed uppermost on the column 17, there is no possibility of the certificate inside the holder becoming accidentally detached from the holder. From the foregoing it will readily be seen that I have provided a certificate holder that will not rattle or create noise while the vehicle is in motion and one that is easily manufactured and installed. It will also be noted that my certificate holder is capable of having a certificate or identification card quickly and readily placed in the same or removed from the same.

Some changes may be made in the construction and arrangement of my improved identification or certificate holder, without departing from the real spirit and purpose of my invention, and it is my intention to cover by my claims any modified forms of structure or use of mechanical equivalents which may be reasonably included within their scope.

I claim:

1. In a device of the class described, a single elongated strip of flexible material doubled back upon itself near its center to form a back portion and a front portion of the certificate holder; said front side of said holder having an opening, a sheet of transparent flexible material for closing said opening, a means for securing one of the side marginal edge portions of said back portion to the marginal side portion of the front portion adjacent to it, two coil springs secured at one of their ends to the marginal side portions of the back and front portions that are secured together and near the ends thereof, respectively, loop members on the free ends of each of said springs and two hook members secured to the opposite marginal side portion of said front portion capable of engaging the said hook members, respectively.

2. In a device of the class described, a single elongated strip of flexible material doubled back upon itself near its center to form a back portion and a front portion of the certificate holder; said front side of said holder having an opening, a sheet of transparent flexible material for closing said opening, a means for securing one of the side marginal edge portions of said back portion to the marginal side portion of the front portion adjacent to it, a coil spring permanently secured at one of its ends to the marginal side portion of the back and front portions that are secured together, a loop member on the free end of said spring, and a hook member secured to the opposite marginal side portion of said front portion capable of engaging the said loop member.

3. In a device of the class described, a single elongated strip of flexible material doubled back upon itself near its center to form a back portion and a front portion of the certificate holder; said front side of said holder having an opening, a sheet of transparent flexible material for closing said opening, a means for securing one of the side marginal edge portions of said back portion to the marginal side portion of the front portion adjacent to it, a plurality of coil springs secured at one of their ends to the marginal side portions of the back and front portions that are secured together, a loop member on the free end of each of said coil springs, and a plurality of hook members secured to the opposite marginal side portion of said front portion capable of engaging the said loop members, respectively.

4. In a device of the class described, a single elongated strip of flexible material doubled back upon itself near its center to form a back portion and a front portion of the certificate holder; said front side of said holder having an opening, a sheet of transparent flexible material for closing said opening, two rivets for securing one of the side marginal edge portions of said back portion to the marginal side portion of the front portion adjacent to it, two coil springs secured at one of their ends to the marginal side portions of the back and front portions that are secured together, a loop member on the free end of each of said springs, and two hook members secured to the opposite marginal side portion of said front portion capable of engaging the said loop members, respectively.

5. In a device of the class described, a single elongated strip of flexible material doubled back upon itself near its center to form a back portion and a front portion of the certificate holder; said front side of said holder having an opening, a sheet of transparent flexible material for closing said opening, two rivets for securing one of the side marginal edge portions of said back portion to the marginal side portion of the front portion adjacent to it, a coil spring having one of its ends secured to each of said rivets, a loop member secured to the free end of each of said coil springs, and two hook members secured to the opposite marginal side portion of said front portion capable of engaging the said loop members.

ANSALEM ORVILLE COBBS.